Oct. 15, 1935.  A. C. WADE  2,017,824

VALVE CONSTRUCTION

Filed July 17, 1930

Witness:
R. B. Davison.

Inventor:
Arthur C. Wade.
By Bruce K. Brown
Atty

Patented Oct. 15, 1935

2,017,824

UNITED STATES PATENT OFFICE 2,017,824

VALVE CONSTRUCTION

Arthur C. Wade, Chicago, Ill., assignor to Standard Oil Company (Indiana), Chicago, Ill., a corporation of Indiana Application July 17, 1930, Serial No. 468,592

4 Claims. (Cl. 251—121)

This invention pertains to surge pumps for hot oil and hot or cold corrosive fluid and, more particularly, to surge valves and their construction.

In processing petroleum oils it is often desirable or necessary to place and maintain the oils under high pressures and temperatures. Whenever it is required that such oils at high temperatures, say around 600 to 650° F., be put under considerable pressure, or, if already under pressure, be pumped from place to place without loss of pressure and temperature, it is usual to employ what are commonly known as surge pumps. These surge pumps, a familiar type of which is illustrated in Thompson Patent No. 1,250,050, comprise a reciprocating pump proper and a surge chamber in which the inlet and outlet valves are located, the pump merely serving to create pressure surges in the oil. The hot oil is usually extremely corrosive in its action on metals and at the pressures and consequent high velocities of its passage through the surge chamber and past the valves therein causes a very rapid erosion of the parts. Perhaps no parts are affected more than the valve cages which serve to confine the ball valves (checks) in their proper positions. Heretofore such cages have been of what may be termed the "spider" or "screen" type, the legs of the "spider" type serving to retain the ball valve, the spaces between the legs permitting the oil to flow on; the large number of openings in the screen type serving this latter purpose. The rapid corrosion and erosion of the valve cages of the aforesaid and other prior types have made it necessary to replace the cages very often, in the case of a continuous pressure still as often as after every run, a run being about two weeks' duration. This has been a most undesirable and unsatisfactory situation, particularly because of the loss of time incurred to effect replacement and the amount of labor and money required.

The present invention is designed to overcome, and in operation does overcome or substantially reduce the above noted defects of and objections to prior types of valve cage, and in addition provides a cage much easier to construct, remove, repair and replace. This may be said to constitute one of the primary objects of the invention.

Another object is to provide a valve cage for such purposes as those specified, so constructed that the ball valve will be cushioned during its rising movement and prevented from hammering with great force against the cage, thereby prolonging the life of the valve and the cage.

A further object is to provide a valve cage so constructed that there is, as respects prior types of cages for similar purposes, less chance of the ball valve changing its seat and causing leaks over a long period of operation.

Many further objects as well as the advantages, the uses and purposes of the invention will be or should become clearly understood and appreciated after reading the following description and claims, and after viewing the drawing in which:

Figure 1:
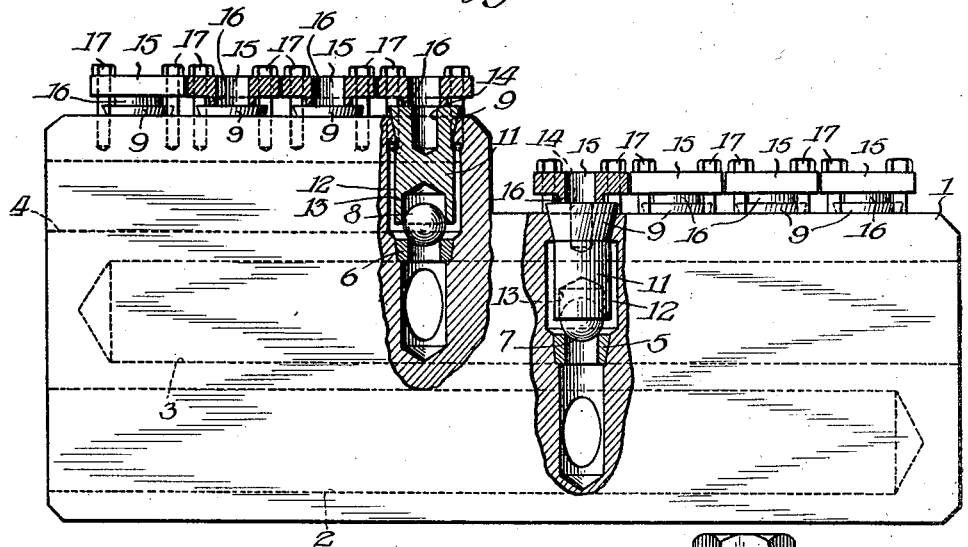
Fig. 1 is a side elevational view, partially in section, of a surge block containing surge chambers, valves and cages constructed in accordance with an approved form of the invention.
Figure 2:
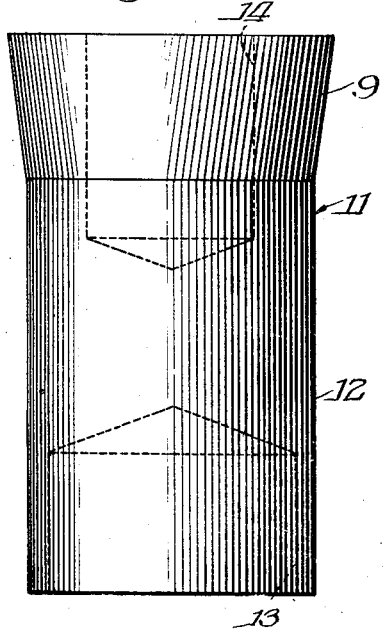
Fig. 2 is a side elevational view of one of the cages shown in Fig. 1, on a larger scale.

The surge block 1 is preferably a heavy steel forging, or the like, in which three chambers, 2, 3 and 4 are formed in any suitable manner. Each of these chambers is closed at one end and open at the other, the chamber 2 being arranged for connection to a source of supply of hot oil, the chamber 3 being arranged for connection with the suction side of the piston of a reciprocating pump and the chamber 4 for connection with a place to which the hot oil is to be delivered. A number of orifices provide intercommunication between the chambers 2 and 3 and between the chambers 3 and 4. Each orifice is provided with a valve seat, such as indicated at 5 and 6, and upon these seats ball valves 7 and 8 respectively are adapted to be seated under the influence of gravity and back pressure in the form illustrated, to prevent the hot oil from flowing backward.

The top of the block 1 is provided with a number of apertures corresponding to the number of valves, each aperture being in axial alignment with the axis of its respective valve orifice. These apertures are tapered downwardly and inwardly to provide seating surfaces conforming to the upper portion 9 of the valve cages generally designated 11, so that when the cages are placed in the apertures, a tight circumferential seal may be effected. The lower portion 12 of the cages projects downwardly into the chambers 3 and 4, respectively, and into proximity to the respective seats 5 and 6. The bottom portion 12 of the cage is recessed out, as indicated at 13, by drilling or in any other suitable manner to provide a recess having a diameter greater than the diameter of the valve ball within which the ball check valve may be received and reciprocate under the action of the surges of hot oil. The depth of the recess 13 may be, as shown, less than the diameter of the valve ball but greater than the radius thereof. The top portion 9 of each cage may also be hollowed out, as indicated by 14, for the purpose of lightening the structure and for the purpose of providing a recess in which a tool may be inserted for assisting in removing the cage from the block. If desired, recess 14 may be threaded internally so that a tool similar to that shown in the modified form of Fig. 3 may be screwed in to give greater leverage.

Oil flowing into the chamber 2 is drawn upwardly through the several orifices communicating with chamber 3 by the suction created by the pull of the piston pump. The ball check valves 7 rising from their seats 5 are forced upwardly into the recesses in their respective cages. As the piston starts its return or pressure stroke, the ball check valves 7 drop back on their seats and the hot oil is forced out of the chamber 3 into the chamber 4, past the check valves 8 which also close against their seats on the suction stroke of the pump piston. Sufficient clearance is allowed between the ball check valves and the side walls of their cages to permit a supply of oil to pass between the balls and their cages to the upper limits of the recesses 13, so that when the balls are driven upwardly by an inflow of oil, the oil in the recesses of the cages serves to cushion the blow of the balls against the cages. This clearance also assists in returning the balls to their seats by equalizing the pressure on their top and bottom sides. This clearance, however, is not sufficient to permit the balls to "flutter" in the cages and a careful proportioning to this end is desirable. The clearance or space between the lower end of each cage and its respective valve seat may be made comparatively short because such spacing or clearance is circumferential; in any event, the spacing distance will be considerably less than the diameter of the ball check.

Various means for securing the cages tightly in place against the high pressures built up in the surge pump may be utilized. In the illustrated embodiment, individual straps 15 having depending hollow bosses 16 adapted to rest and press upon the tops of the cages are secured in place and to the block 1 by means of a suitable number of stud bolts 17. After the cages are put in place, the straps are placed across their tops with the bosses resting on the top surfaces of the cages, and the bolts are put in and drawn down. This arrangement, together with the construction of the cages greatly facilitates assembly and disassembly of the valves and their associated parts.

Figure 3:
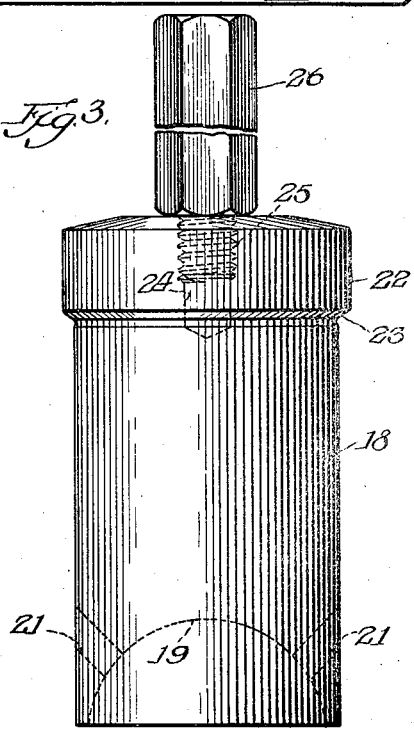
Fig. 3 is a similar view of a modified form of valve cage.

Fig. 3 illustrates a modified form of valve cage. Lower portion 18 of this cage is recessed out to provide a hemispherical surface 19, the radius of curvature preferably being just slightly greater than the radius of curvature of the ball valve over which it is positioned. In this form it may be necessary or advisable to provide, by drilling or otherwise, one or more small passageways 21 leading from the exterior of the cage to the interior thereof. These passageways which should be, in number, the minimum necessary, and ordinarily just one or two, serve to equalize the pressure on each side of the ball when it rises into the hemispherical recess in the cage so that the ball will not stick therein. The upper portion 22 of this cage is provided with a relatively narrow seating surface 23 for which a corresponding seat must be provided in the surge chamber block. The center top portion of this cage is recessed as shown at 24 and provided with internal threads 25 for the reception of similar threads formed on a knock-out pin 26. The pin 26 may be provided with facets adapted to be engaged with similar internal facets formed in the bore of the boss of the hold-down strap so that the cage may be positioned in a particular way and held in that position. Obviously, the cage 11 may be held in a fixed position relative to any diameter by similar means.

The valve block, or valve chest 1, is preferably made of forged steel, A. S. T. M. specifications, while the valve cages may be made of cold rolled steel although they are preferably made of Calite, the trade name of an alloy composed of iron, nickel, chromium, aluminum and carbon, or Ascoloy, the trade name of an alloy composed of iron, approximately 86%, and chromium, approximately 14%. These alloys have been found to be desirable for uses such as the present one because they are anti-corrosive.

While I have illustrated and described my invention in a preferred form and a modification thereof, I do not desire to be limited except by the spirit of the invention and the scope of the appended claims.

I claim:

1. In a surge valve of the character described, means providing a fluid chamber with an inlet orifice and an outlet orifice, a valve seat member providing a valve seat about said inlet orifice, a valve cage projecting into said chamber toward and in substantially axial alignment with the axis of said seat member, said cage at its upper end being recessed to receive a holding means, said cage at its end adjacent said seat member being spaced therefrom to provide a fluid passage to said outlet orifice circumferentially of said seat member, said cage at its lower end being recessed and having substantially continuous side walls and a ball valve normally seated on said seat member and movable into said recess end of said cage away from said seat.

2. In a surge valve of the character described, means providing a fluid chamber with an inlet orifice and an outlet orifice, a valve seat member providing a valve seat about said inlet orifice, a valve cage having one end projecting into said chamber toward and into the proximity of said seat member, said cage at its upper end being recessed to receive a holding means, the lower end of said cage being recessed and having substantially continuous side walls about said recess, and a ball valve normally seated on said seat and movable into said recess in said cage away from said seat, said cage end being spaced from said seat member a distance less than a diameter of said ball.

3. A valve of the character described comprising, a fluid chamber provided with an inlet orifice, an opening in axial alignment with said inlet orifice formed with tapering side walls and an outlet orifice, means providing a valve seat about said inlet orifice, a valve cage having one end projecting into said chamber through said opening toward and into the proximity of said valve seat and having its other end formed with a tapering external side wall portion engageable with the tapering wall of said opening, said valve cage having that portion receivable within said chamber formed with relatively smooth and uninterrupted side walls and having an imperforate walled recess in that end adjacent to said valve seat, means for applying thrust to the valve cage in the direction of said chamber to maintain sealing contact between the tapering wall portions of the cage and chamber opening, and a valve ball normally seated on said valve seat and movable into said recess in said cage when urged away from said seat, said recess in said cage having a depth less than the diameter of said valve ball, said cage being spaced away from said valve seat a distance less than the diameter of the valve ball.

4. A valve of the character described comprising, a fluid chamber provided with an inlet orifice, an opening in axial alignment with said inlet orifice formed with tapering side walls and an outlet orifice, means providing a valve seat about said inlet orifice, a valve cage having one end projecting into said chamber through said opening toward and into the proximity of said valve seat and having its other end formed with a tapering external side wall portion engageable with the tapering wall of said opening, said valve cage having that portion receivable within said chamber formed with relatively smooth and uninterrupted side walls and having an imperforate walled recess in that end adjacent to said valve seat, means for applying thrust to the valve cage in the direction of said chamber to maintain sealing contact between the tapering wall portions of the cage and chamber opening, and a valve ball normally seated on said valve seat and movable into said recess in said cage when urged away from said seat, said recess having a diameter slightly greater than the diameter of said valve ball and a depth less than the diameter but greater than the radius of said valve ball, said cage being spaced away from said valve seat a distance less than the radius of the valve ball.

ARTHUR C. WADE.